United States Patent [19]

Wells

[11] Patent Number: 4,519,590
[45] Date of Patent: May 28, 1985

[54] AXLE CLAMP FOR FILAMENT REINFORCED SYNTHETIC MATERIAL LEAF SPRINGS

[75] Inventor: Wayne E. Wells, Farmington Hills, Mich.

[73] Assignee: Ford Motor Company, Dearborn, Mich.

[21] Appl. No.: 455,695

[22] Filed: Jan. 5, 1983

[51] Int. Cl.³ .............................................. F16F 1/30
[52] U.S. Cl. ..................................... 267/52; 267/149; 403/226
[58] Field of Search .................. 267/36 R, 38, 40, 42, 267/43, 44, 47, 49, 51, 52, 53, 148, 149; 403/203, 221, 222, 226, 227, 390, 392

[56] References Cited

U.S. PATENT DOCUMENTS

| | | | |
|---|---|---|---|
| 1,458,149 | 6/1923 | Reed | 267/52 |
| 1,512,109 | 10/1924 | Laher | 267/47 |
| 1,727,019 | 9/1929 | Shore | 267/53 |
| 2,280,347 | 4/1942 | Olley et al. | 267/52 |
| 2,600,843 | 6/1952 | Bush | 267/149 |
| 2,643,111 | 6/1953 | Burton | 267/47 |
| 2,654,597 | 10/1953 | Barenyi | 267/52 |
| 2,829,881 | 4/1958 | Morris | 267/149 |
| 3,142,598 | 7/1964 | Rosen | 267/47 |
| 3,541,605 | 11/1970 | Mohl | 267/47 |
| 3,586,307 | 6/1971 | Brownyer | 267/47 |
| 3,968,958 | 7/1976 | Huchette et al. | 267/47 |

FOREIGN PATENT DOCUMENTS 54-141944  11/1979  Japan ................................. 267/149

*Primary Examiner*—George E. A. Halvosa
*Assistant Examiner*—Richard R. Diefendorf
*Attorney, Agent, or Firm*—Peter D. McDermott; Roger L. May

[57] ABSTRACT

An improved axle clamp is required, particularly for use with composite material leaf springs, to securely fix the position of the leaf spring relative to the axle or other wheel carrying member such as in the suspension system of an automotive vehicle. The present invention provides an axle clamp comprising a clamp base (1) and a wedge insert (2). The clamp base provides a platform portion (3) and substantially parallel side walls (4A, 4B) extending from the platform portion to form a channel adapted to receive the wedge insert. The inner surface of at least one side wall of the clamp base provides a channel-widening concavity (5A, 5B). The wedge insert has a platform portion (7) and substantially parallel side walls (9A, 9B) extending from the platform portion forming an inner channel adapted to jacket a mid-portion of the leaf spring (10). The outer surface of at least one side wall of the wedge insert provides a convexity adapted to engage and substantially fill the channel-widening concavity of the clamp base. According to one embodiment, an axle clamp assembly comprises the clamp base and wedge insert and further comprises a clamp plate (12) positioned over the leaf spring opposite the clamp base and adapted to be attached thereto to hold the leaf spring securely between them. Optionally, a resilient pad (11) is provided mediate the leaf spring and the clamp plate.

10 Claims, 3 Drawing Figures

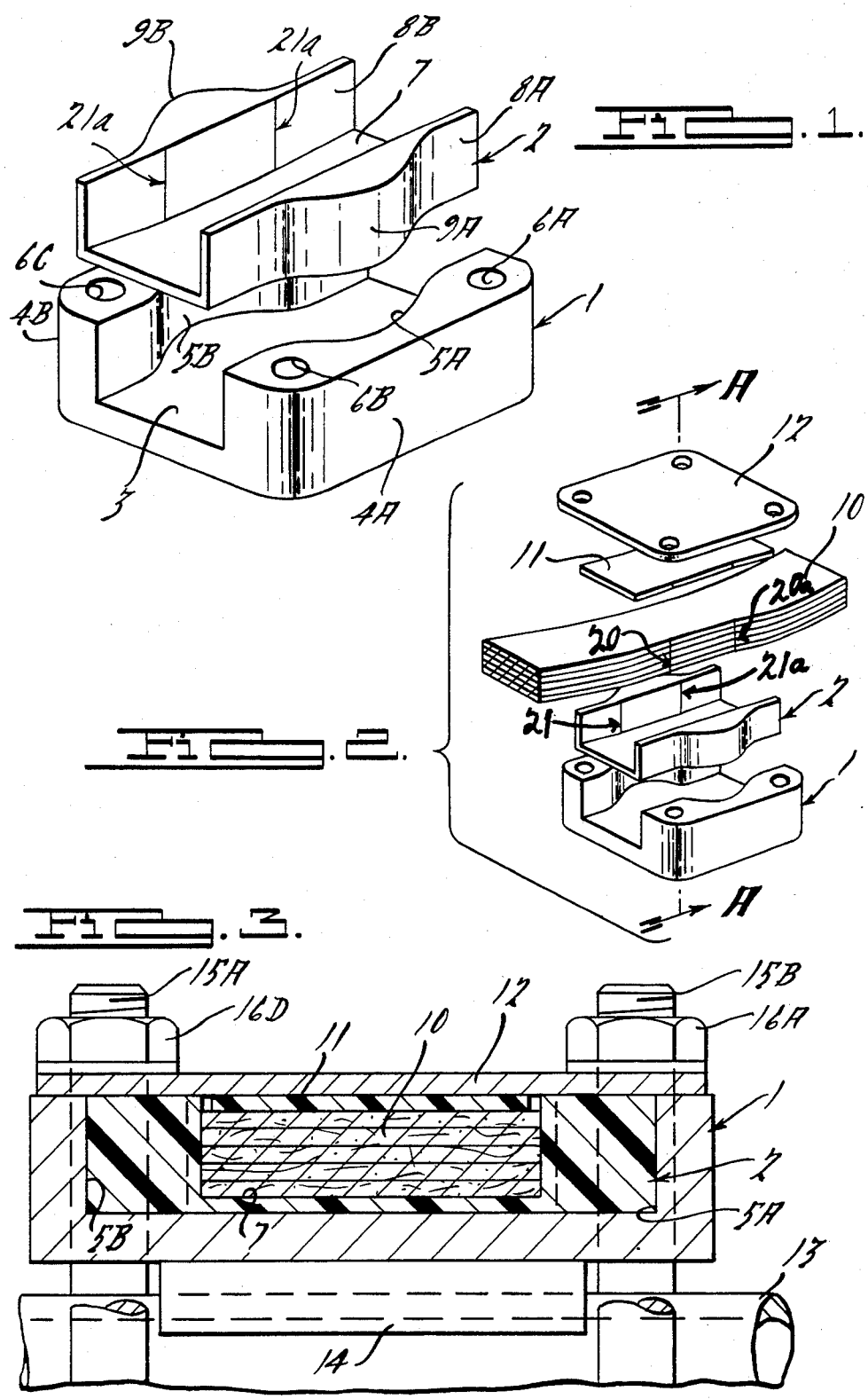

AXLE CLAMP FOR FILAMENT REINFORCED SYNTHETIC MATERIAL LEAF SPRINGS

TECHNICAL FIELD

This invention relates to a novel axle clamp adapted to secure a filament reinforced synthetic material leaf spring on an axle without damage or dislocation of the reinforcing filaments or resin matrix of the leaf spring. The axle clamp of the invention accurately and securely fixes the position of the filament reinforced synthetic material leaf spring relative the axle.

BACKGROUND ART

Composite material leaf springs are known, which springs typically comprise a filler material, for example glass roving or other filamentary solids, in an organic solid such as thermoplastic or thermosetting plastic. Such springs are shown, for example, in U.S. Pat. Nos. 2,600,843; 2,829,881 and 3,142,598. Known methods of making composite material leaf springs include, for example, filament winding methods, compression molding methods and pultrusion methods.

In the past, composite material leaf springs have been used in automotive vehicle suspension systems with associated hardware to accurately position and hold the spring. Such spring clamping hardware has been fashioned after hardware previously known for use in conjunction with metal leaf springs. In a typical arrangement, the spring is positioned between a clamping plate on one side and the axle or other wheel carrying member on the other side. Often, a second clamping plate or the like is positioned between the spring and the axle to act as a spring seat. Bolts or the like, for example U-bolts, are used to clamp the clamping plate and spring to the axle. An abrasion resistant pad can be used between the spring and the clamping plate and/or between the spring and the axle (or spring seat). Exemplary clamping hardware for a composite material leaf spring is seen, for example, in U.S. Pat. Nos. 3,968,958; 3,586,307 and 3,541,605.

Known leaf spring clamping hardware has been found inadequate in certain respects for use in conjunction with composite material leaf springs. Specifically, such spring clamping hardware has been found inadequate to hold the spring in a fixed position relative the axle under conditions experienced in ordinary use. More specifically, known spring clamping hardware has failed in ordinary use to prevent longitudinal movement of the spring, that is, movement of the spring in a direction along its longitudinal axis (which typically is transverse to the longitudinal axis of the axle). While the longitudinal position of the spring could be adequately fixed by providing a hole through the composite material of the leaf spring and bolting the spring to the spring clamping hardware, this presents several disadvantages. Providing the bolt hole in the leaf spring requires additional fabrication time and introduces additional complexity and cost. In addition, the bolt hole significantly weakens the composite material spring, and so the spring must be made larger, heavier and more costly.

Movement of the composite material leaf spring relative the axle or other wheel carrying member in a direction along the longitudinal axis of the leaf spring changes the pivot point of the leaf spring against the axle. Consequently, the spring rate is altered and the spring fails to perform according to design. Moreover, upon flexure of the spring, the compressive and tensile stresses are improperly distributed, which can lead to increased material fatigue and decreased spring life. Moreover, if excessive, such movement can lead to damage to the vehicle powertrain.

A composite material leaf spring suitable for use on an automotive vehicle and an axle clamp for use with same is disclosed in commonly assigned U.S. patent application Ser. No. 405,961 filed June 25, 1982. The composite material leaf spring comprises a position-setting concavity in its surface and the axle clamp comprises a corresponding position-setting convexity. Together, the position-setting concavity and the position-setting convexity accurately and securely fix the position of the composite spring relative the axle clamp and, indirectly, relative the axle. In one embodiment, a resilient sheet is positioned mediate the clamping plate and the leaf spring other than at the area of engagement of the position-setting concavity by the clamping plate channel convexity, and a resilient spring seat pad is positioned mediate the leaf spring and the axle or more typically mediate the leaf spring and a spring seat.

It is an object of the present invention to provide an axle clamp which secures a filament reinforced composite material leaf spring in position relative the axle. More particularly, it is an object of the invention to provide an axle clamp which in ordinary use substantially prevents longitudinal movement of the leaf spring, that is, movement of the spring in a direction along its longitudinal axis. Further, it is a particular object of the invention to provide an axle clamp which does not require either damage or dislocation of either the reinforcing filaments or the resin matrix of the leaf spring and, specifically, which does not require any hole(s) through the leaf spring or concavities in the surface of the leaf spring or other complexities in the shape of the leaf spring.

DISCLOSURE OF THE INVENTION

This invention provides an axle clamp adapted to hold a synthetic material leaf spring in position relative an axle, which axle clamp comprises a rigid clamp base and a resilient wedge insert. The clamp base comprises a platform portion and two substantially parallel side walls extending from the platform portion to form a channel adapted to receive a wedge insert. The inner surface of at least one of the side walls provides a channel-widening concavity. The wedge insert comprises a platform portion and two substantially parallel side walls extending from the wedge insert platform portion to form an inner channel adapted to jacket a mid-portion of a leaf-spring. The outer surface of at least one side wall of the wedge insert provides a convexity corresponding to the aforesaid channel-widening concavity of the clamp base, which convexity is adapted to engage and substantially fill that corresponding channel-widening concavity.

The axle clamp of the present invention is seen to be particularly advantageous in view of its ability to fix or secure the position of a leaf spring, particularly a filament reinforced composite material leaf spring, without damaging either the reinforcing filaments or the resin matrix of the leaf spring. It is particularly advantageous that the axle clamp provides such position-fixing function without being bolted to the leaf spring or otherwise positively attached to it. This advantage presents a significant advance in the art since it has been found that the presence of bolt holes and like interruptions and dislocations in the filament reinforced synthetic material of composite material leaf springs can significantly reduce the strength, structural integrity and durability of the leaf spring.

The channel-widening concavity of the clamp base portion of the axle clamp functions together with the convexity provided by the outer surface of the wedge insert side wall to prevent movement of the leaf spring relative to the axle, particularly in a direction along the longitudinal axis of the leaf spring. Preferably the two side walls of the clamp base provide symmetrical and oppositely disposed channel-widening concavities. Preferably the depth of the concavity in the side wall of the clamp base is uniform in a direction normal to the platform portion of the clamp base. Axle clamp embodiments of the invention comprising such preferred aspects have been found to function quite satisfactorily in use in the suspension system of an automotive passenger vehicle and involve relative ease of manufacture and assembly.

According to one most preferred embodiment of the invention described further below, an axle clamp adapted to secure a synthetic material leaf spring in position in a suspension system comprises:

A. a rigid clamp base comprising a platform portion and two substantially parallel side walls extending substantially perpendicularly from opposite edges of the platform portion to form a channel, the inner surface of each side wall providing a channel-widening concavity which is substantially symmetrical, through a plane which bisects the channel longitudinally, to the channel-widening concavity of the other side wall of the clamp base;

B. a resilient wedge insert positioned within the aforesaid channel, comprising a wedge insert platform portion positioned substantially parallel to and adjacent to the clamp base platform portion, and two substantially parallel side walls extending substantially perpendicularly from the wedge insert platform portion to form an inner channel adapted to jacket a mid-portion of the leaf spring, the outer surface of each wedge insert side wall providing a convexity substantially filling the channel-widening concavity of the corresponding clamp base side wall;

C. a leaf spring, the mid-portion of which is jacketed by the wedge insert, that is, the mid-portion of which is positioned within the aforesaid inner channel formed by the wedge insert; and D. a clamp plate attached to the clamp base, which clamp plate and clamp base together hold the leaf spring between them.

The present invention provides an effective and inexpensive solution to the problems described above associated with the use of known composite material leaf springs. By preventing movement of the leaf spring relative to the axle in a direction along the longitudinal axis of the leaf spring, the proper pivot point is maintained for the leaf spring against the axle (or against a spring seat mediate the axle and the leaf spring). Consequently, the spring rate is not altered and the spring performs more consistantly according to design. Thus, upon flexure of the spring, the compressive and tensile stresses are more properly distributed, thus avoiding material fatigue which otherwise could decrease the useful life of the spring. One most significant advantage of the invention is that it does not require a bolt hole or the like attachment means at the mid-portion of the leaf spring to facilitate attachment of the leaf spring to the axle clamp. Thus, additional fabrication time, complexity and cost required to provide such attachment means is avoided. In addition, absent such bolt hole, a spring of a given size will be stronger and more resilient. Accordingly leaf springs for use with the axle clamp of the present invention can be designed smaller and of lighter weight for a given application. Reduced material costs and reduction in weight are highly significant advantages in applications such as automotive vehicle suspension, for which the present invention is especially well suited.

BRIEF DESCRIPTION OF THE DRAWINGS

FIG. 1 is a perspective view of an axle clamp according to a preferred embodiment of the present invention.

FIG. 2 is an exploded view of an assembly according to a preferred embodiment of the present invention, which assembly incorporates the axle clamp of FIG. 1.

FIG. 3 is an elevation in partial cross-section of the assembly of FIG. 2 taken through line A—A, shown mounted to an axle using appropriate additional hardware.

DETAILED DESCRIPTION OF THE INVENTION

Other features and advantages of this invention will become more apparent from the following, detailed description thereof and from the drawings illustrating the preferred embodiment and best mode of carrying out this invention.

Referring now to the drawings, FIG. 1 shows an axle clamp according to a preferred embodiment of the invention comprising a clamp base 1 and a wedge insert 2. The clamp base has a platform portion 3 and side walls 4A and 4B extending from the platform portion to form therewith a channel adapted to receive the wedge insert. Since composite material leaf springs typically are of rectangular cross-section, the side walls of the clamp base will typically be substantially perpendicular to the platform portion. The inner surface of each side wall provides a channel-widening concavity 5A, 5B That is, the channel-side surface of each side of the clamp base wall provides a concave region. The clamp base further provides bolt-holes 6A, 6B 6C 6D (6D not shown) to facilitate assembly of the axle clamp and attachment thereof to the axle or spring seat. The wedge insert 2 has a platform portion 7 and substantially parallel side walls 8A and 8B extending from the platform portion to form therewith an inner channel adapted to jacket a mid-portion of the leaf spring. The outer surface of each side wall of the wedge insert provides a convexity 9A and 9B each being adapted to engage and substantially fill the corresponding channel-widening concavity of the clamp base. That is, each side wall of the wedge insert provides a convex portion or region which matches and is adapted to mate with the channel-widening concave region of the adjacent side wall of the clamp base. Of course, for flexibility of design or other reasons the clamp base side walls can provide multiple position-fixing concavities and the wedge insert can provide corresponding convexities for one or more but less than all of those concavities.

As aforesaid, the wedge insert is adapted to receive and jacket a mid-portion of the leaf spring. That is, the surface of the inner channel formed by the wedge insert is contoured to lay closely against the corresponding surface of the leaf spring. Typically, a composite material leaf spring will provide an axle attachment region, a central portion of substantially constant-width. The leaf spring is generally not, however, of constant-width along its entire length, but rather becomes wider toward each end before again becoming narrow at each eye of the leaf spring. According to a preferred embodiment of the present invention, the axle clamp extends over a sufficient portion of the leaf spring to jacket not only the constant-width central portion of the leaf spring but also some of the wider portion of the leaf spring on either side thereof. According to this embodiment, the wedge insert is fashioned such that the contour of its inner channel corresponds to the contour of the entire portion of the leaf spring which it jackets. That is, the inner channel becomes wider at each end corresponding to the widening of the leaf spring.

This can be seen most clearly in FIG. 2 showing an axle clamp assembly according to a preferred embodiment of the invention. In leaf spring 10 (the ends of which are broken away) lines 20 and 20A indicate the boundry between the central constant-width portion of the leaf spring and the widening portion on either side thereof. Correspondingly, lines 21 and 21A in the inner channel formed by the wedge insert are the boundry between the central portion of the inner channel adapted to jacket the central constant-width portion of the leaf spring and the portions of the inner channel on either side thereof, each of which is adapted to jacket part of the widening portion of the leaf spring. It will be readily understood from the present disclosure that any longitudinal movement of the leaf spring relative to the axle clamp of the invention would produce a wedge effect. That is, any such longitudinal movement of the leaf spring would act to force a wider portion of the leaf spring into one end of the inner channel of the wedge insert. Obviously, any such longitudinal movement would be effectively prevented by such wedge effect.

The assembly of FIGS. 2 and 3 comprises the clamp base and wedge insert described above together with a composite material leaf spring 10 (the ends of which are broken away), a resilient upper pad 11 and a clamp plate 12. The resilient pad is adapted to be positioned between the leaf spring and the clamp plate. Also shown in FIG. 3 for purposes of illustrating an exemplary application of the present invention are axle 13, spring seat 14 and attachment means for securing the axle clamp assembly to the axle and spring seat. The attachment means comprises a pair of U-bolts 15A and 15B which extend around the axle and through bolt holes in the axle clamp assembly. The U-bolts are held by four fastening nuts, of which two nuts 16A and 16D are shown.

The channel-widening concavity of the clamp base and the corresponding convexity of the wedge insert need not have any particular configuration or dimensions. A concavity of any configuration and dimensions is suitable, which upon engagement thereof by the corresponding wedge insert convexity substantially secures the composite material leaf spring against movement relative to the axle in the direction along the longitudinal axis of the leaf spring. In this regard, the preferred configuration is that shown in FIGS. 1–3, wherein one concavity is provided in each side wall of the clamp base, the concavities being preferably substantially symmetrical through a plane (perpendicular to the platform portion) bisecting the channel longitudinally. Preferably each such concavity is such that it gradually and continuously widens in a direction along the longitudinal axis of the channel to the longitudinal mid-point of the channel and thereafter gradually and continuously narrows to its original width, being at each point preferably of uniform depth over the entire height of the side wall. Suitable alternative configurations will be apparent to the skilled of the art in view of the present disclosure. In general, a suitable configuration will depend, in part, upon the application to which the axle clamp assembly is to be put and, more particularly, upon the stress likely to be encountered by the leaf spring in a direction along the longitudinal axis of the leaf spring. In general, it will be within the skill of those of average skill in the art, in view of the present disclosure, to provide an axle clamp according to the present invention having a clamp base and wedge insert configuration suitable to substantially fix the leaf spring in position relative to the axle.

The axle clamp of the present invention is suitable for use in conjunction with leaf springs fabricated of metal but is particularly advantageous for use with composite material leaf springs. Such composite materials typically comprise filler materials such as, for example, aramid fibers, graphite fibers, metal fibers, glass roving or other filamentary solids and/or non-filamentary solids. Glass roving is generally preferred in view of the physical properties of the resulting leaf spring and in view of the ease and cost efficiency of manufacturing the leaf springs by filament winding techniques. The composite material further comprises an organic solid matrix such as, for example, polyester, epoxy or other suitable thermoset plastic or a suitable thermoplastic. As an alternative to filament winding, the leaf spring can be manufactured by pultrusion methods or by compression molding or other methods known to the skilled of the art.

Generally, the axle clamp of the present invention can be employed together with a suitable leaf spring in any application for which metal or composite material leaf springs are suitable and can be employed in those applications according to methods well known to the skilled of the art. Thus, for example, the axle clamp of the present invention can be used in the suspension system of an automotive vehicle in conjunction with additional suitable hardware, substantially as shown in FIG. 3.

Preferably, the clamp base comprises suitable metal, for example, steel and the channel-widening concavities within the longitudinal channel of the clamp base can be provided by well known pressing or stamping operations during the manufacture of the clamp base. In addition to cast metal, stamped metal and the like, various other suitable materials and methods of forming the clamp base and methods of forming the channel-widening concavities thereof will be apparent to the skilled of the art in view of the present disclosure. Thus, for example, in certain applications the clamp base can be formed of suitable thermoset plastic, filament reinforced thermoset plastic and the like.

In the preferred embodiment shown, the clamp base provides bolt holes 6A, 6B, 6C and 6D (not shown) adapted to receive U-bolts 15A and 15B. The U-bolts are adapted to receive fastening nuts 16A, 16D (shown in FIG. 3) and 16B and 16C (not shown). Alternate methods and devices of securing the axle clamp assembly (and, hence, the leaf spring) to the axle or other wheel carrying member, or more preferably, to a suitable spring seat, such as spring seat 14 shown in FIG. 3, which is itself mounted to the axle, are known to the skilled of the art and can be employed in alternate embodiments of the present invention.

While not wishing to be bound by theory, it is presently understood that the invention functions by providing a wedge effect between the wedge insert and the clamp base whereby a high friction engagement of the inner surface of the wedge insert by the leaf spring is generated by transmittal of longitudinal forces from the leaf spring to the axle clamp. Thus, as it is presently understood, increased loads on the axle serve to increase the wedge effect and thus to increase the holding capability of the axle clamp. It will be recognized that the invention provides a significant advance in the art since the leaf spring is held in position without any positive attachment between the axle clamp and the leaf spring. No damage need be done to the leaf spring in the nature of bolt holes or the like nor any distortion or dislocation of the surface of the leaf spring to facilitate an attachment between the leaf spring and the axle clamp.

The thickness and configuration of the wedge insert platform portion and side walls are not critical, except that the convexities of the side walls should be designed to engage and substantially fill the corresponding channel-widening concavities of the clamp base. The material of the wedge insert, in general, should be of sufficient thickness and resilience to prevent undue stress configuration against the surface of the leaf spring, that is, to disperse pressures transmitted from the clamp base and by the upper clamp plate. When used in the suspension system of an automotive vehicle or other similar application, the wedge insert is preferably sufficiently thick to substantially dampen vibrations which would otherwise be transmitted from the axle through the leaf spring to the vehicle chassis. The wedge insert should also be sufficiently tough to withstand the mechanical working of the clamp base against the surface of the leaf spring and to protect the leaf spring against such mechanical working. Suitable materials for the wedge insert include, for example, natural rubber, suitable urethanes, suitable neoprenes and the like. Preferably the material is fabric reinforced, preferably cloth fabic reinforced, since such reinforced materials have been found to provide excellent tear resistance, even following prolonged use. Most preferred is cloth fabric reinforced urethane or neoprene. Natural rubber is less preferred where the axle clamp assembly is intended for use in the suspension system of an automotive vehicle or other like environment in which it may be exposed to oil, gasoline and the like, in view of the poor resistance of natural rubber to these elements. Where a urethane is used, preferably it is a hard urethane and sufficiently tough to withstand prolonged mechanical working. Other resilient materials suitable to provide the wedge function of the wedge insert and otherwise suitable for use in the preferred and alternate environments of the invention will be apparent to those skilled in the art in view of the present disclosure.

While the thickness of the resilient upper pad is not critical in all applications, it should be sufficiently thick to disperse pressures transmitted from the clamp base and clamp plate to the composite material leaf spring and to protect the leaf spring against any edges, etc. presented by the clamp base or by the clamp plate. When used in the suspension system of an automotive vehicle or other similar application, the resilient upper pad is preferably sufficiently thick to aid in substantially dampening vibrations which otherwise would be transmitted from the axle to the vehicle chassis. In general, it will be within the ability of those skilled in the art, in view of the present disclosure, to determine a suitable configuration and thickness for the resilient upper pad for use in axle clamp assemblies according to the above-described or alternate embodiments of the present invention. Suitable materials for the resilient sheet will be apparent to those skilled in the art in view of the present disclosure and include, for example, those materials used for the wedge insert such as natural rubber and synthetic rubbers, for example neoprenes, urethanes, and the like.

As noted above FIGS. 2 and 3 illustrate an assembly according to one embodiment of the present invention, which comprises the clamp base and wedge insert of FIG. 1 together with leaf spring 10, resilient pad 11 and clamp plate 12. As seen in FIG. 3, the assembly is mounted on axle 13 via spring seat 14. It can be seen that the resilient wedge insert is positioned within the channel formed by the rigid clamp base. The platform portion of the wedge insert is positioned substantially parallel and adjacent to the channel-side surface of the platform portion of the clamp base. Likewise, the outer surface of the side walls of the wedge insert are substantially parallel to and adjacent to the channel-side surface of the corresponding side walls of the clamp base. Thus, the channel-widening concavity in each clamp base side wall is substantially filled by a corresponding convexity in the side walls of the wedge insert. It can be seen that the longitudinal inner channel formed by the wedge insert jackets a mid-portion of the leaf spring. The mid-portion of the leaf spring is any longitudinal portion thereof between the two ends of the leaf spring, which includes, or at least is proximate the longitudinal midpoint of the leaf spring. As used herein, in reference to the axle clamp assembly aspect of the present invention, the mid-portion of the leaf spring is substantially that portion which is jacketed by the longitudinal channel of the wedge insert. Typically, such mid-portion is approximately centered between the two ends of the leaf spring. The clamp plate is attached to the clamp base such that together they hold the leaf spring between them. Also included in this preferred embodiment is an upper resilient pad 11, as described above, positioned mediate the leaf spring and the clamp plate.

In FIG. 3, the engagement of the channel-widening concavity in each side wall of the clamp base by the corresponding convexity of the outer surface of the side walls of the wedge insert is clearly seen. It will be recognized from these drawings that the axle clamp assembly of the present invention effectively and inexpensively functions to prevent the leaf spring from shifting its position relative to the axle in a direction along the longitudinal axis of the leaf spring and also in a direction along the longitudinal axis of the axle. This latter function may be met in some applications also by the attachment of the ends of the leaf springs to the chassis frame.

While the invention has been shown and described in its preferred embodiment, it will be clear to those skilled in the art that changes and modifications can be made thereto without departing from the scope of the invention.

INDUSTRIAL APPLICABILITY

It will be obvious from the foregoing that this invention has industrial applicability to automotive vehicles and provides an axle clamp and an axle clamp assembly for the suspension system thereof, wherein a leaf spring is prevented from shifting its position relative to the axle or other wheel carrying member in a direction along the longitudinal axis of the leaf spring. In addition, the axle clamp and axle clamp assembly of the present invention have industrial applicability to suspension systems other than for motor vehicles, for example, for stationary machines and devices, and further have industrial applicability to uses such as will be apparent in view of the present disclosure to those skilled in various related arts.

What is claimed is:

1. An axle clamp adapted to hold a synthetic material leaf spring in position relative to an axle, which leaf spring has upper, lower and side surfaces, which axle clamp comprises a rigid clamp base and a resilient wedge insert, said clamp base comprising a platform portion and two substantially parallel side walls extending from said platform portion to form a channel adapted to receive said wedge insert, the inner surface of at least one said side wall providing a channel-widening concavity, and said wedge insert comprising a wedge insert platform portion and two substantially parallel wedge insert side walls extending from said wedge insert platform portion to form an inner channel adapted to have planar surface contact with said side surfaces of said leaf spring at a mid-portion of said leaf spring for frictional engagement thereof to provide longitudinal positioning of said leaf spring, the outer surface of at least one said wedge insert side wall providing a convexity adapted to engage and substantially fill said channel-widening concavity; and means for clamping said leaf spring in said clamp base.

2. The axle clamp of claim 1, wherein said wedge insert comprises a material selected from the group consisting of natural rubber, synthetic rubber and the like.

3. The axle clamp of claim 1, wherein said wedge insert comprises cloth fabric-reinforced synthetic rubber.

4. The axle clamp of claim 1, wherein said wedge insert comprises urethane synthetic rubber.

5. An axle clamp assembly adapted to secure a synthetic material leaf spring in position in a suspension system, which leaf spring has upper, lower and side surfaces, said axle clamp assembly comprising:
    a rigid clamp base comprising a platform portion and two substantially parallel side walls extending from said platform portion to form a channel, the inner surface of at least one of said side walls providing a channel-widening concavity;
    a resilient wedge insert positioned within said channel, comprising a wedge insert platform portion positioned substantially parallel to and adjacent to said clamp base platform portion, and two substantially parallel side walls extending from said wedge insert platform portion to form an inner channel adapted to have planar surface contact with said side surfaces of said leaf spring at a mid-portion of said leaf spring for frictional engagement thereof to provide longitudinal positioning of said leaf spring, the outer surface of at least one said wedge insert side wall providing a convexity substantially filling said channel-widening concavity;
    the mid-portion of said leaf spring being jacketed by said wedge insert; and
    a clamp plate attached to said clamp base, said clamp plate and clamp base together holding said leaf spring between them.

6. The axle clamp assembly of claim 5 further comprising a resilient upper pad mediate said leaf spring and said clamp plate.

7. The axle clamp assembly of claim 5, wherein said wedge insert comprises a material selected from the group consisting of natural rubber, synthetic rubber and the like.

8. The axle clamp assembly of claim 5, wherein said wedge insert comprises cloth fabric-reinforced synthetic rubber.

9. An axle clamp assembly adapted to secure a synthetic material leaf spring in position in a suspension system, said axle clamp assembly comprising:
    a leaf spring having upper, lower and side surfaces;
    a rigid clamp base comprising a platform and two substantially parallel side walls extending substantially perpendicularly from opposite edges of said platform portion to form a channel, the inner surface of each said side wall providing a channel-widening concavity which is substantially symmetrical, through a plane bisecting said channel longitudinally, to the channel-widening concavity of the other side wall of said clamp base;
    a resilient wedge insert positioned within said channel comprising a wedge insert platform portion positioned substantially parallel to and adjacent to said clamp base platform portion, and two substantially parallel side walls extending substantially perpendicularly from said wedge insert platform portion to form an inner channel adapted to have planar surface contact with said side surfaces of said leaf spring at a mid-portion of said leaf spring for frictional engagement thereof to provide longitudinal positioning of said leaf spring, the outer surface of each said wedge insert side wall providing a convexity substantially filling said channel-widening concavity of the corresponding clamp base side wall;
    the mid-portion of said leaf spring being jacketed by said wedge insert; and
    a clamp plate attached to said clamp base, said clamp plate and clamp base together holding said leaf spring between them.

10. The axle clamp assembly of claim 9 further comprising a resilient upper pad mediate said leaf spring and said clamp plate.

* * * * *